United States Patent
Fukami et al.

(10) Patent No.: US 9,493,058 B2
(45) Date of Patent: Nov. 15, 2016

(54) SUNROOF DRAIN DEVICE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Kiyozumi Fukami, Chiryu (JP); Yuya Aoki, Toyota (JP); Shohei Kobata, Chita-gun (JP); Akira Matsuura, Toyota (JP); Sumio Sakaguchi, Toyoto (JP); Toshihisa Tanaka, Toyota (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/919,868

(22) Filed: Oct. 22, 2015

(65) Prior Publication Data
US 2016/0114665 A1    Apr. 28, 2016

(30) Foreign Application Priority Data
Oct. 23, 2014   (JP) ................................. 2014-216185

(51) Int. Cl.
*B60J 7/00* (2006.01)
*B60J 7/043* (2006.01)
*B60J 10/12* (2006.01)

(52) U.S. Cl.
CPC .............. *B60J 7/0084* (2013.01); *B60J 7/043* (2013.01); *B60J 10/12* (2013.01)

(58) Field of Classification Search
CPC ............................. B60J 7/0084; B60J 10/12
USPC ....................................................... 296/213
See application file for complete search history.

(56) References Cited

U.S. PATENT DOCUMENTS

| | | | | |
|---|---|---|---|---|
| 3,024,569 A * | 3/1962 | Nearing | ............... | A01G 9/1423 47/18 |
| 3,252,289 A * | 5/1966 | Tennison, Jr. | ......... | E04D 13/068 405/122 |
| 3,894,767 A * | 7/1975 | Schatzler | ................... | B60J 7/05 296/213 |
| 8,523,277 B2 * | 9/2013 | Heo | .......................... | B60J 7/02 296/213 |
| 2001/0030149 A1* | 10/2001 | Naddy | ................. | B01D 29/336 210/162 |
| 2008/0136219 A1* | 6/2008 | Berryhill | ................ | B60J 7/0084 296/213 |

FOREIGN PATENT DOCUMENTS

| | | | | |
|---|---|---|---|---|
| EP | 0148429 A2 * | 7/1985 | .......... | E04D 13/031 |
| JP | 2008063742 | * | 7/1985 | |
| JP | 04-101721 U1 | 9/1992 | | |
| JP | 9-48368 | 2/1997 | | |
| JP | 2001-180290 A | 7/2001 | | |
| JP | 2008-63742 | 3/2008 | | |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof drain device includes a drain portion that includes a bottom wall, a first side wall that rises up in the height direction of the vehicle from an edge end of the bottom wall that is positioned on a side near the opening, and a second side wall that rises up higher than the first side wall in the height direction of the vehicle from an edge end of the bottom wall that is positioned on a side away from the opening. The sunroof drain device also includes a sawtooth-shaped portion that is provided protruding upward in the height direction of the vehicle on the bottom wall so as to extend along the boundary portion, with a surface that is on the side away from the opening being more gradually inclined than a surface that is on the side near the opening.

14 Claims, 2 Drawing Sheets

SUNROOF DRAIN DEVICE

INCORPORATION BY REFERENCE

The disclosure of Japanese Patent Application No. 2014-216185 filed on Oct. 23, 2014 including the specification, drawings and abstract is incorporated herein by reference in its entirety.

BACKGROUND OF THE INVENTION

1. Field of the Invention

The invention relates to a sunroof drain device.

2. Description of Related Art

Japanese Patent Application Publication No. 2008-63742 (JP 2008-63742 A), for example, described a known sunroof drain device. This device is provided with water droplet fragmenting means on a bottom surface of a trough-shaped drain passage (a drain portion), and is designed to reduce the splash height of water droplets of rain water or the like that fall down into an opening/closing body and a closed portion (a boundary portion) of an opening, by breaking up the water droplets using this water droplet fragmenting means. As a result, the splash of the water droplets is able to be prevented from flying out of the drain passage, without increasing the height of the side walls of the drain passage.

In the technology described in JP 2008-63742 A, when water droplets get in during high-pressure washing or the like, for example, the force is extremely strong, so it is necessary to ensure sufficient protrusion length of a protruding portion of the water droplet fragmenting means in order to break up the water droplets so that the falling energy of the water droplets can be sufficiently reduced. As a result, the drainage performance of the drain passage may be reduced due to the water droplet fragmenting means.

SUMMARY OF THE INVENTION

The invention thus provides a sunroof drain device capable of inhibiting the splash of water droplets that have gotten in from a boundary portion between an opening formed in a roof of a vehicle and a panel that closes this opening, from getting into a cabin, while inhibiting a reduction in drainage performance.

One aspect of the invention relates to a sunroof drain device that includes a drain portion and a sawtooth-shaped portion. The drain portion includes a bottom wall that is positioned below, in a height direction of a vehicle, a boundary portion between an opening formed in a roof of the vehicle and a panel that closes off the opening, so as to extend along the boundary portion, a first side wall that rises up in the height direction of the vehicle from an edge end of the bottom wall that is positioned on a side near the opening, and a second side wall that rises up higher than the first side wall in the height direction of the vehicle from an edge end of the bottom wall that is positioned on a side away from the opening. The sawtooth-shaped portion is provided protruding upward in the height direction of the vehicle on the bottom wall so as to extend along the boundary portion, with a surface that is on the side away from the opening being more gradually inclined than a surface that is on the side near the opening.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a sunroof drain device according to one example embodiment of the invention will be described. In the description below, a front-rear direction of the vehicle will be referred to as the "front-rear direction", and upward and downward in a height direction of the vehicle will be referred to as "upward" and downward", respectively.

Figure 1:
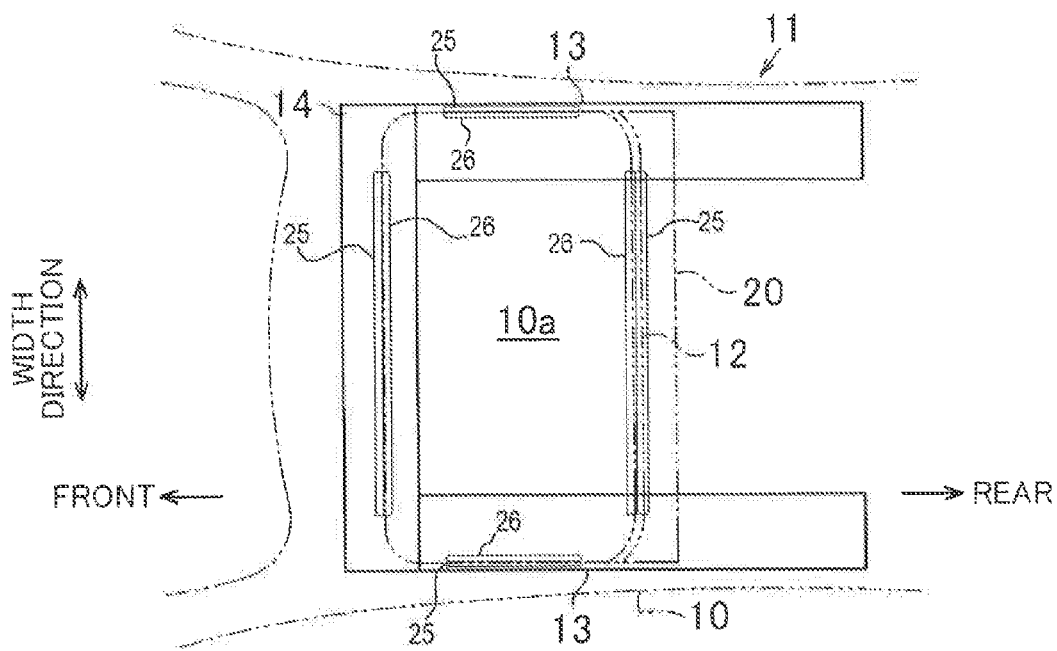
FIG. 1 is a plan view schematically showing one example embodiment of the invention.

As shown in FIG. 1, a generally rectangular opening 10a is formed in a roof 10 of a vehicle such as an automobile, and a sunroof apparatus 11 is mounted to the roof 10. This sunroof apparatus 11 includes a generally rectangular movable panel 12 made of a glass panel, for example, that moves in the front-rear direction to open and close the opening 10a. Also, the sunroof apparatus 11 includes a pair of guide rails 13 arranged one on each edge portion of the opening 10a in a width direction of the vehicle. The guide rails 13 are made of aluminum alloy extruded material, for example, have a constant cross-section in a length direction, and extend in the front-rear direction. Moreover, the sunroof apparatus 11 includes a front housing 14 that extends in the width direction of the vehicle along a front edge portion of the opening 10a. This front housing 14 connects front ends of the guide rails 13 together. Also, a rain channel 20 made of resin material, for example, that extends in the width direction of the vehicle along a rear edge portion of the movable panel 12 is connected to the movable panel 12 so as to move together with the movable panel 12.

Therefore, basically, the guide rails 13 are positioned on the edge portions in the width direction of the vehicle, the front housing 14 is positioned on the front edge portion, and the rain channel 20 is positioned on the rear edge portion, below a boundary portion between the opening 10a and the movable panel 12 (the movable panel 12 that closes the opening 10a) that is in a completely closed state. Therefore, water droplets of rainwater or the like that have gotten in from the boundary portion between the opening 10a and the movable panel 12 in a completely closed state are received by both guide rails 13, the front housing 14, and the rain channel 20. Hereinafter, the movable panel 12 side of the boundary portion or the side near the opening will be referred to as the "inside", and the opening 10a side of the boundary portion or the side away from the opening will be referred to as the "outside".

The movable panel 12 is linked to and supported by a well-known functional component, not shown, arranged on the guide rails 13, and opens and closes with the operation of this functional component. That is, the movable panel 12 i) tilts up, in which a rear portion thereof moves upward by pivoting in one direction around a front portion thereof, ii) tilts down, in which the rear portion moves downward by pivoting in the other direction around the front portion, and iii) slides in the front-rear direction. A so-called inner sliding method by which the movable panel 12 is made to slide while tilted down is employed for the opening/closing operation of the movable panel 12. At this time, the movable panel 12 moves, together with the rain channel 20, toward the rear of the vehicle along the guide rails 13.

Figure 2:
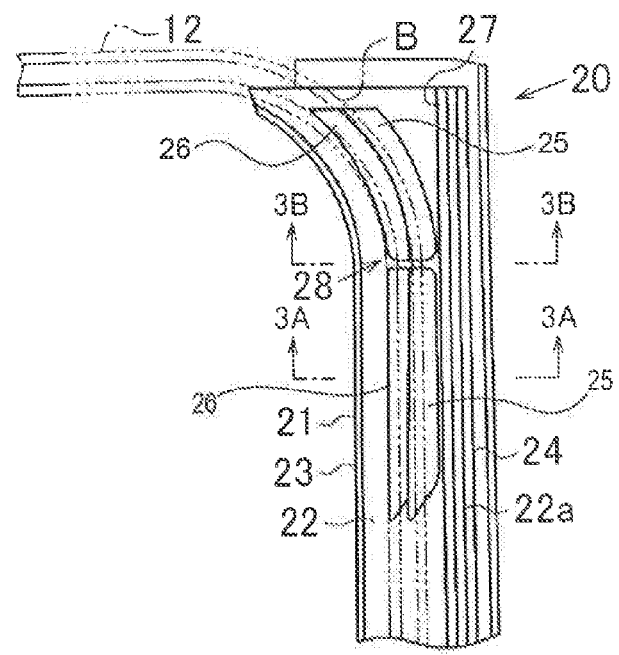
FIG. 2 is a plan view of the example embodiment.
Figure 3A:
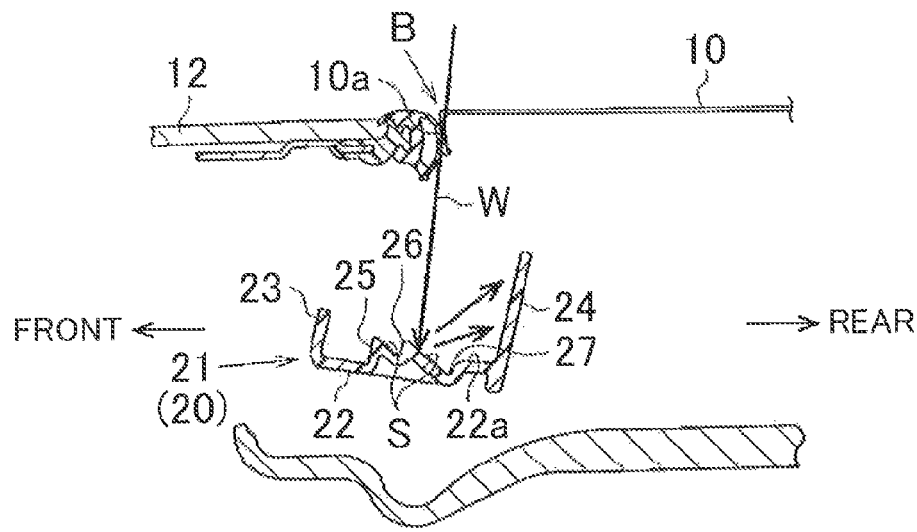
FIG. 3A is a sectional view taken along line 3A-3A in FIG. 2.
Figure 3B:
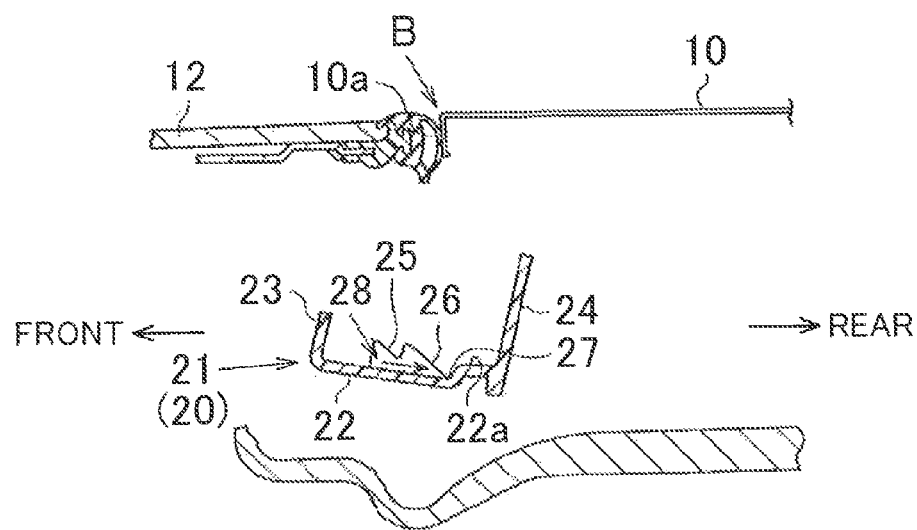
FIG. 3B is a sectional view taken along line 3B-3B in FIG. 2.

Next, the rain channel 20 will be described. As shown in FIGS. 2 and 3A and 3B, the rain channel 20 includes a drain portion 21 that extends in the width direction of the vehicle along a boundary portion B (which corresponds to a seal portion) between the opening 10a and the movable panel 12 in a completely closed state. This drain portion 21 has three walls, i.e., a generally long bottom wall 22 positioned below the boundary portion B so as to extend along this boundary portion, a first side wall 23 that rises up from an inside end (an edge end that is positioned on a side near the opening 10a) of the bottom wall 22, and a second side wall 24 that rises up from an outside end (an edge end that is positioned on a side away from the opening 10a) of the bottom wall 22, all of which are integrated together such that the drain portion 21 has a generally U-shaped cross-section that is open upward. Thus, the drain portion 21 runs in the width direction of the vehicle, below the boundary portion B.

A corner (end portion) of the boundary portion B is curved to match the design of the movable panel 12. An end portion of the drain portion 21 in the width direction of the vehicle gradually spreads out toward a tip end by a widening amount of the bottom wall 22, by the first side wall 23 curving to match the forward curvature (i.e., curvature toward the front of the vehicle) of the corner of the boundary portion B, and the second side wall 24 extending in a straight line in the width direction of the vehicle. Also, the bottom wall 22 is inclined such that the outside end is positioned generally lower than the inside end. This is to maintain the posture of the rain channel 20 so that the bottom wall 22 will be substantially parallel to the extending direction of the guide rails 13, when the movable panel 12 is slid while tilted down. Further, the bottom wall 22 has a raised portion 22a that protrudes in a general stand-shape on a connecting portion (an outside end) that is connected to the second side wall 24, such that a generally V-shaped through-groove 27 is formed in a lower end (inside end) that is positioned relatively lower than the raised portion 22a. Therefore, this through-groove 27 runs along the second side wall 24 to the tip end portion of the drain portion 21 in the width direction of the vehicle. The dimension of the second side wall 24 in a height direction of the vehicle is set larger than that dimension of the first side wall 23, so the second side wall 24 rises higher than the first side wall 23.

A pair of sawtooth-shaped portions 25 and 26 are provided protruding upward so as to extend in the width direction of the vehicle along the boundary portion B, on each end portion of the bottom wall 22 in the width direction of the vehicle. The sawtooth-shaped portions 25 and 26 are juxtaposed in the front-rear direction, with rear portions (surfaces of the sawtooth-shaped portions that is on the side away from the opening 10a) S that are on the rear side of crest portions being more gently inclined than front portions (surfaces of the sawtooth-shaped portions that is on the side near the opening 10a) that are on the front side of the crest portions. That is, the front portion of each of the sawtooth shapes 25 and 26 that is on the front side of the crest portion rises at a substantially right angle with respect to the bottom wall 22, and the rear portion S that is on the rear side of the crest portion is gently inclined with respect to the bottom wall 22. In the other words, the sawtooth-shaped portion includes at least two protruding portions 25 and 26 that are juxtaposed in a front-rear direction of the vehicle, the protruding portions each having a surface on the side near the opening and a surface on the side away from the opening, which sandwich a crest of the protruding portion 25, 26; and the surface on the side away from the opening is formed on the sawtooth-shaped portion such that a virtual line extending perpendicular from the surface intersects with the second side wall. The front sawtooth-shaped portion 25 is connected to the rear sawtooth-shaped portion 26 above the bottom wall 22.

Also, a break portion 28 where the sawtooth-shaped portions 25 and 26 are eliminated midway in the width direction of the vehicle (i.e., in the extending direction) is provided on the bottom wall 22. This break portion 28 is arranged at the start of the curve toward the front of the vehicle, of the boundary portion B.

Next, the operation of this example embodiment will be described. Water droplets of rainwater or the like that have gotten in from the boundary portion B with rainfall or the like, for example, are caught by the bottom wall 22, and consequently run in the width direction of the vehicle along the drain portion 21. Then, the water that has reached the open end (the tip end in the width direction of the vehicle) of the drain portion 21 is drained outside via a well-known drainage apparatus provided on the vehicle.

Meanwhile, as shown in FIG. 3A, splash W of the water droplets that have gotten in from the boundary portion B during high-pressure washing or the like, for example, basically strikes the gently inclined rear portions S of the sawtooth shaped portions 25 and 26, and as a result, flies toward the second side wall 24 that rises relatively high and receives the splash W such that the splash W runs down onto the bottom wall 22. By guiding the path of the splash W of water droplets that have gotten in from the boundary portion B in this away, the splash W is able to be inhibited from getting into the cabin that is on the movable panel 12 side.

As described in detail above, with this example embodiment, the effects described below are able to be obtained. (1) In this example embodiment, the splash W of water droplets that have gotten in from the boundary portion B basically strikes the gently inclined rear portions S of the sawtooth-shaped portions 25 and 26, and as a result, flies toward the second side wall 24 that rises relatively high and receives the splash W such that the splash W runs down onto the bottom wall 22. By guiding the path of the splash W of water droplets that have gotten in from the boundary portion B in this away, the splash W is able to be inhibited from getting into the cabin that is on the movable panel 12 side. Also, even though the sawtooth-shaped portions 25 and 26 are provided protruding on the bottom wall 22, they extend in a groove shape along the boundary portion B, i.e., extend in the drainage direction of the drain portion 21, so a decrease in drainage performance of the drain portion 21 is able to be inhibited.

(2) The sawtooth-shaped portions 25 and 26 are curved at the positions of both curved end portions of the boundary portion B in the width direction of the vehicle, and water tends to collect in uneven portions of the sawtooth-shaped portions 25 and 26 at these curved portions. In this example embodiment, as shown in FIG. 3B, water that has collected in the uneven portions of the sawtooth-shaped portions 25 and 26 is guided to the through-groove 27 through the break portion 28, and thus is able to be drained smoothly, so water is able to be inhibited from collecting in the drain portion 21. More specifically, the bottom wall 22 is inclined such that the outside end is positioned lower than the inside end. As a result, water that has collected in the uneven portions of the sawtooth-shaped portions 25 and 26 is able to be guided even more smoothly to the through-groove 27 via the break portion 28.

(3) In this example embodiment, water is able to be drained more smoothly by having the break portion 28 arranged at the start of the curve of the sawtooth-shaped portions 25 and 26, where water tends to collect in the uneven portions of the sawtooth-shaped portions 25 and 26. (4) In this example embodiment, the splash W of water droplets that have gotten in from the boundary portion B is able to be inhibited from getting into the cabin, while a decrease in the drainage performance of the drain portion 21 is able to be suitably inhibited, by providing the sawtooth-shaped portions 25 and 26 only at a portion (both end portions in the width direction of the vehicle) of the bottom wall 22.

(5) In this example embodiment, the splash W of water droplets that flies in all directions is received using the second side wall 24 that forms the drain portion 21, so the number of parts and the cost are able to be reduced compared to when the splash is received by a separate part made of rubber or the like, for example.

(6) In this example embodiment, the splash W of water droplets that have gotten in from the boundary portion B is able to be inhibited from flying toward the inside of the cabin by the sawtooth-shaped portions 25 and 26. (7) In this example embodiment, the splash W of water droplets that have gotten in from the boundary portion B is inhibited from getting into the cabin, so electronic components that tend to be mounted inside the cabin are able to be more securely protected.

(8) In this example embodiment, even though the dimension of the second side wall 24 of the drain portion 21 in the height direction of the vehicle is relatively large, the second side wall 24 is positioned to the rear of the opening 10a where there are relatively fewer restrictions on mounting space, so mountability in the vehicle is able to be inhibited from deteriorating.

The example embodiment described above may also be modified as described below.

In the example embodiment described above, the front portions that are on the front side of the crest portions of the sawtooth-shaped portions 25 and 26 may also be inclined tilted toward the rear with respect to the bottom wall 22 as long as they are steeper than the rear portions S that are on the rear side of the crest portions of the sawtooth-shaped portions 25 and 26.

In the example embodiment described above, the arrangement and number of break portions 28 is arbitrary. Also, the break portion 28 may also be omitted.

In this example embodiment, as long as interference with peripheral components is able to be avoided, the sawtooth-shaped portions 25 and 26 may extend in the width direction of the vehicle along substantially the entire length of the bottom wall 22 (the drain portion 21).

In the example embodiment described above, the number of sawtooth-shaped portions provided protruding on the bottom wall 22 may be one or three or more.

In the example embodiment described above, a similar sawtooth-shaped portion 25, 26 may also be provided protruding on a drain portion (a bottom wall) of each guide rail 13 and a drain portion (a bottom wall) of the front housing 14, as shown in FIG. 1.

A fixed panel that permanently closes off the opening 10a may also be used instead of the movable panel 12.

One aspect of the invention relates to a sunroof drain device that includes a drain portion and a sawtooth-shaped portion. The drain portion includes a bottom wall that is positioned below, in a height direction of a vehicle, a boundary portion between an opening formed in a roof of the vehicle and a panel that closes off the opening, so as to extend along the boundary portion, a first side wall that rises up in the height direction of the vehicle from an edge end of the bottom wall that is positioned on a side near the opening, and a second side wall that rises up higher than the first side wall in the height direction of the vehicle from an edge end of the bottom wall that is positioned on a side away from the opening. The sawtooth-shaped portion is provided protruding upward in the height direction of the vehicle on the bottom wall so as to extend along the boundary portion, with a surface that is on the side away from the opening being more gradually inclined than a surface that is on the side near the opening.

According to this structure, the splash of water droplets that have gotten in from the boundary portion basically strike the generally inclined surface of the sawtooth-shaped portion that is on the side away from the opening, and as a result, flies toward the second side wall that rises relatively high and receives the splash such that the splash runs down onto the bottom wall. By guiding the path of the splash of water droplets that have gotten in from the boundary portion in this away, the splash is able to be inhibited from getting into the cabin that is on the panel side. Also, even though the sawtooth-shaped portion is provided protruding on the bottom wall, it extends along the boundary portion, i.e., extends in the drainage direction of the drain portion, so a decrease in drainage performance of the drain portion is able to be inhibited.

In the sunroof drain device described above, a through-groove that runs in a straight line in the extending direction of the bottom wall is formed in the bottom wall, and a break portion where the sawtooth-shaped portion is eliminated midway in the extending direction may be set.

Normally, the boundary portion is curved at both end portions to match the design of the panel, and the sawtooth-shaped portion is also curved at the positions of both end portions of the boundary portion. In this case, water tends to collect in an uneven portion of the sawtooth-shaped portion at these curved portions. According to this structure, water that has collected in the uneven portion of the sawtooth-shaped portion is guided to the through-groove via the break portion, and thus is able to be drained smoothly, so water is able to be inhibited from collecting in the drain portion.

In the sunroof drain device described above, the break portion may be arranged at a starting point of a curve of the sawtooth-shaped portion. According to this structure, the break portion is arranged at the starting point of the curve of the sawtooth-shaped portion, where water tends to collect in the uneven portion of the sawtooth-shaped portion.

This aspect of the invention is effective in inhibiting the splash of water droplets that have gotten in from a boundary portion between an opening formed in a roof of a vehicle and a panel that closes this opening, from getting into a cabin, while inhibiting a reduction in drainage performance.

What is claimed is:

1. A sunroof drain device characterized by comprising:
   a drain portion including
      a bottom wall that is positioned below, in a height direction of a vehicle, a boundary portion between an opening formed in a roof of the vehicle and a panel that closes off the opening, so as to extend along the boundary portion; and
      a first side wall that rises up in the height direction of the vehicle from an edge end of the bottom wall that is positioned on a side near the opening, and a second side wall that rises up higher than the first side wall in the height direction of the vehicle from an edge end of the bottom wall that is positioned on a side away from the opening; and a sawtooth-shaped portion that is provided protruding upward in the height direction of the vehicle on the bottom wall so as to extend along the boundary portion, a surface of the sawtooth-shaped portion that is on the side away from the opening being more gradually inclined than a surface of the sawtooth-shaped portion that is on the side near the opening.

2. The sunroof drain device according to claim 1, wherein a through-groove that runs in a straight line in the extending direction of the bottom wall is formed in the bottom wall; and a break portion where the sawtooth-shaped portion is eliminated midway in the extending direction thereof is set.

3. The sunroof drain device according to claim 2, wherein the break portion is arranged at a starting point of a curve of the sawtooth-shaped portion.

4. The sunroof drain device according to claim 1, wherein the drain portion is arranged on a guide rail arranged on both edge portions of the opening in a width direction of the vehicle.

5. The sunroof drain device according to claim 2, wherein the drain portion is arranged on a guide rail arranged on both edge portions of the opening in a width direction of the vehicle.

6. The sunroof drain device according to claim 3, wherein the drain portion is arranged on a guide rail arranged on both edge portions of the opening in a width direction of the vehicle.

7. The sunroof drain device according to claim 1, wherein the drain portion is arranged on a front housing that extends in a width direction of the vehicle along a front edge portion of the opening.

8. The sunroof drain device according to claim 2, wherein the drain portion is arranged on a front housing that extends in a width direction of the vehicle along a front edge portion of the opening.

9. The sunroof drain device according to claim 3, wherein the drain portion is arranged on a front housing that extends in a width direction of the vehicle along a front edge portion of the opening.

10. The sunroof drain device according to claim 4, wherein
the drain portion is arranged on a front housing that extends in a width direction of the vehicle along a front edge portion of the opening.

11. The sunroof drain device according to claim 5, wherein
the drain portion is arranged on a front housing that extends in a width direction of the vehicle along a front edge portion of the opening.

12. The sunroof drain device according to claim 6, wherein
the drain portion is arranged on a front housing that extends in a width direction of the vehicle along a front edge portion of the opening.

13. The sunroof drain device according to claim 1, wherein
the bottom wall is inclined such that the side away from the opening side is positioned lower than the opening side in the height direction of the vehicle.

14. The sunroof drain device according to claim 2, wherein
the bottom wall is inclined such that the side away from the opening side is positioned lower than the opening side in the height direction of the vehicle.

* * * * *